(12) United States Patent
Engel

(10) Patent No.: US 7,952,842 B2
(45) Date of Patent: May 31, 2011

(54) CIRCUIT INTERRUPTER

(75) Inventor: Joseph C. Engel, Monroeville, PA (US)

(73) Assignee: Eaton Corporation, Cleveland, OH (US)

( * ) Notice: Subject to any disclaimer, the term of this patent is extended or adjusted under 35 U.S.C. 154(b) by 847 days.

(21) Appl. No.: 11/862,342

(22) Filed: Sep. 27, 2007

(65) Prior Publication Data

US 2009/0086387 A1 Apr. 2, 2009

(51) Int. Cl.
*H02H 3/00* (2006.01)

(52) U.S. Cl. .............................. 361/42; 361/93.1; 361/94

(58) Field of Classification Search ..................... 361/42, 361/44, 45, 47, 93.1, 94, 96, 97, 98
See application file for complete search history.

(56) References Cited

U.S. PATENT DOCUMENTS

| | | | | |
|---|---|---|---|---|
| 4,442,472 A * | 4/1984 | Pang et al. ....................... | 361/96 |
| 4,589,052 A * | 5/1986 | Dougherty ....................... | 361/94 |
| 5,224,006 A * | 6/1993 | MacKenzie et al. ............. | 361/45 |
| 5,260,676 A | 11/1993 | Patel et al. | |
| 5,293,522 A | 3/1994 | Fello et al. | |
| 5,691,869 A * | 11/1997 | Engel et al. ....................... | 361/42 |
| 6,707,651 B2 | 3/2004 | Elms et al. | |
| 6,720,872 B1* | 4/2004 | Engel et al. .................... | 340/514 |
| 2005/0103613 A1* | 5/2005 | Miller ........................... | 200/400 |
| 2005/0219775 A1* | 10/2005 | Shipp et al. ......................... | 361/5 |
| 2006/0018059 A1 | 1/2006 | Elms et al. | |
| 2007/0242402 A1* | 10/2007 | Papallo et al. .................... | 361/63 |
| 2008/0142486 A1* | 6/2008 | Vicente et al. ................. | 218/154 |

* cited by examiner

*Primary Examiner* — Patrick Salce
(74) *Attorney, Agent, or Firm* — Martin J. Moran

(57) ABSTRACT

A circuit breaker includes separable contacts; a load conductor; a neutral conductor; and an operating mechanism structured to open and close the separable contacts. An arc fault trip circuit cooperates with the operating mechanism and trips open the separable contacts responsive to detection of an arc fault condition associated with current flowing through the separable contacts. A ground fault trip circuit cooperates with the operating mechanism and is structured to trip open the separable contacts responsive to detection of a ground fault condition associated with current flowing through the separable contacts, the load conductor and the neutral conductor. The arc fault trip circuit includes an integration capacitor, and the ground fault trip circuit includes an output to the integration capacitor.

2 Claims, 14 Drawing Sheets

CIRCUIT INTERRUPTER

BACKGROUND OF THE INVENTION

1. Field of the Invention

This invention pertains generally to circuit interrupters and, more particularly, to such circuit interrupters structured to trip open separable contacts responsive to arc fault, ground fault and/or overvoltage conditions.

2. Background Information

Circuit interrupters include, for example, circuit breakers, contactors, motor starters, motor controllers, other load controllers and receptacles having a trip mechanism. Circuit breakers are generally mature and well known in the art. Examples of circuit breakers are disclosed in U.S. Pat. Nos. 5,260,676; and 5,293,522.

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal which is heated and bends in response to a persistent overcurrent condition. The bimetal, in turn, unlatches a spring powered operating mechanism which opens the separable contacts of the circuit breaker to interrupt current flow in the protected power system. An armature, which is attracted by the sizable magnetic forces generated by a short circuit or fault, also unlatches, or trips, the operating mechanism.

In many applications, the miniature circuit breaker also provides ground fault protection. Typically, an electronic circuit detects leakage of current to ground and generates a ground fault trip signal. This trip signal energizes a shunt trip solenoid, which unlatches the operating mechanism, typically through actuation of the thermal-magnetic trip device.

A common type of ground fault detection circuit is the dormant oscillator detector including first and second sensor coils. The line and neutral conductors of the protected circuit pass through the first sensor coil. The output of this coil is applied through a coupling capacitor to an operational amplifier followed by a window comparator having two reference values. A line-to-ground fault causes the magnitude of the amplified signal to exceed the magnitude of the reference values and, thus, generates a trip signal. At least the neutral conductor of the protected circuit passes through the second sensor coil. A neutral-to-ground fault couples the two detector coils that cause the amplifier to oscillate, thereby resulting in the generation of the trip signal. See, for example, U.S. Pat. Nos. 5,260,676; and 5,293,522.

Recently, there has been considerable interest in also providing protection against arc faults. Arc faults are intermittent high impedance faults which can be caused, for instance, by worn insulation between adjacent conductors, by exposed ends between broken conductors, and in other situations where conducting elements at different potentials are in close proximity. Because of their intermittent and high impedance nature, arc faults do not generate currents of either sufficient instantaneous magnitude or sufficient average heating or RMS current value large enough to trip the conventional circuit interrupter. Even so, the arcs can cause damage or start a fire if they occur near combustible material. It is not practical to simply lower the pick-up currents on conventional circuit breakers, as there are many typical loads which draw similar currents and would, therefore, cause nuisance trips. Consequently, separate electrical circuits have been developed for responding to arc faults. See, for example, U.S. Pat. Nos. 5,224,006; and 5,691,869.

For example, an arc fault circuit interrupter (AFCI) is a device intended to mitigate the effects of arc faults by functioning to deenergize an electrical circuit when an arc fault is detected. Known AFCIs are packaged as miniature circuit breakers. They are installed in panelboards, just as standard circuit breakers, and thus provide protection of the complete branch circuit wiring from panelboard to outlet. Additionally, they provide protection of appliance and extension cords against insulation failure related arcing events. While not required by the Underwriters Laboratory (UL) AFCI Standard UL1699, such AFCIs also provide low level ground fault protection, typically set at 50 mA peak. This protection, in combination with arc fault protection, has been shown by UL to be effective in protecting against high resistance connections, such as can develop at connections on electrical wiring devices, such as twist-on wire connectors, receptacles, wall switches or light fixtures, that can ultimately lead to an insulation failure. Neither arc fault nor ground fault alone was shown to provide optimum protection; both are required. Arc fault protection is uniquely effective against a line-to-neutral fault, while ground fault protection is uniquely effective against a neutral-to-ground fault. Both are effective against a line-to-ground fault.

Today, ground fault protection of a ground fault circuit interrupter (GFCI) is required, for example and without limitation, for residential bathrooms, garages, kitchens and outside receptacles. These locations normally do not involve surge protecting power strips or products like computers that sometimes have built-in surge protection. In contrast, AFCIs are used, for example and without limitation, in home bedrooms, studies and other living areas where surge protection is common.

U.S. Pat. No. 6,707,651 and U.S. Patent Application Pub. No. 2006/0018059 disclose a trip unit including a trip logic circuit that is incorporated in a bipolar arc fault/ground fault Application Specific Integrated Circuit (ASIC). The ASIC inexpensively provides suitable gate current in response to one of two trip requests (e.g., arc fault trip and ground fault trip) when a triac is in an OFF state with a suitable supporting voltage and when the ASIC is suitably powered. The trip unit operates with a circuit interrupter, such as an arc fault or ground fault circuit breaker.

Although the ASIC provides a reliable and relatively low cost circuit to trip the arc fault or ground fault circuit breaker, certain nuisance trips may occur. For example, utilities routinely switch capacitors to adjust power factor and, more often, to adjust line voltage in rural areas. The line series source inductance combined with a shunt capacitor yields a series resonant circuit, such that voltage with the capacitor can be slightly larger than that without the capacitor. Unfortunately, when the capacitor is switched in, a decaying sinusoidal transient voltage can occur. This transient voltage typically lasts only a few milliseconds, but can have a peak value nearly twice the normal line voltage peak. If a surge protector, such as those used in conventional power strips (e.g., without limitation, power strips used to protect home electronic equipment, such as televisions or computers), is located on the branch circuit being protected, then the normal peak voltage limiting action of the corresponding power strip MOV(s) (metal oxide varistors) results in a relatively high, but relatively very short, ground fault current. The MOV functions by clamping line-to-ground overvoltage transients. The MOV clamping process can produce a relatively very large current transient (measured in amperes), but a typically relatively very short (e.g., about 100 uS) ground current transient. If the power strip is located on an AFCI protected branch circuit, then the AFCI will (ground fault) trip as the result of such a transient.

The ASIC ground fault trip circuit includes a differential current transformer, an amplifier and a window comparator. The current output of the differential current transformer is input to the amplifier. The output of the amplifier is input to the window comparator. Whenever the magnitude of the amplifier output exceeds the high or low limits of the window comparator, a ground fault trip request is immediately generated with no time delay. Here, there is a problem due to the lack of a time delay.

The ASIC and the corresponding AFCI are designed for nominal 120 VAC operation with a tolerance of +/− 10%. It is possible, for example, during home construction with temporary power, and even after the home is completed and occupied, that an extreme overvoltage condition can develop due to a loss of a service input neutral connection in a 3-wire 120/240 power system or a 3/4-wire 120/208 VAC power system. Without a neutral to establish a midpoint for these power systems, a phase-to-neutral voltage can reach an extreme and damaging value. While the ASIC and the corresponding AFCI components can survive this condition on a temporary basis, certain parts will eventually fail because of overheating.

The ASIC and the corresponding AFCI may trip due to certain loads with a relatively high current inrush. These loads include certain power tools such as "chop saws", compressors and a number of relatively new and high technology variable speed vacuum sweepers. These loads can be characterized as having a relatively large current with a lagging power factor (unlike, for example, a lamp) during the starting inrush period. Hence, it is desirable to minimize or eliminate tripping resulting from such loads.

The ASIC includes a trigger circuit that generates a single pulse each alternating current line cycle whenever a test button is pushed. This pulse is sent into the arc detection circuitry such that if this circuitry is working correctly, a trip will occur as is required by UL 1699. A recognized weakness of the test button is that determination of health of the AFCI requires pushing the test button, which causes interruption of the branch circuit voltage if the circuit interrupter is healthy. As such, for example, clocks, VCRs and other loads need to be manually reset.

UL943 (Underwriters Laboratory's Ground Fault Circuit Interrupter Standard) is being changed to address this issue. It is believed that one of two approaches will be required. The first approach requires that if the circuit interrupter fails, then the test button test must be "locked out" and not allowed to be reset and to supply power. However, this is not practical for a circuit breaker. The second approach requires a "visible" indication of a failure, which allows the state of the circuit interrupter to be determined without pushing the test button.

There is room for improvement in circuit interrupters structured to trip open separable contacts responsive to arc fault, ground fault and/or overvoltage conditions.

Furthermore, there is also room for improvement in the power dissipation of a circuit interrupter including an ASIC.

SUMMARY OF THE INVENTION

As one aspect of the invention, a circuit interrupter comprises: at least one pair of separable contacts; a load conductor; a neutral conductor; an operating mechanism structured to open and close the at least one pair of separable contacts; an arc fault trip circuit cooperating with the operating mechanism, the arc fault trip circuit being structured to trip open the at least one pair of separable contacts responsive to detection of an arc fault condition associated with current flowing through the at least one pair of separable contacts; and a ground fault trip circuit cooperating with the operating mechanism, the ground fault trip circuit being structured to trip open the at least one pair of separable contacts responsive to detection of a ground fault condition associated with current flowing through the at least one pair of separable contacts, the load conductor and the neutral conductor, wherein the arc fault trip circuit includes a delay circuit, and wherein the ground fault trip circuit includes an output to the delay circuit.

As another aspect of the invention, a circuit interrupter comprises: a line terminal; a load terminal; separable contacts electrically connected between the line terminal and the load terminal; a neutral terminal; an operating mechanism structured to open and close the separable contacts; a first trip circuit cooperating with the operating mechanism, the first trip circuit being structured to trip open the separable contacts responsive to detection of a fault condition associated with current flowing through the separable contacts; and a second overvoltage trip circuit cooperating with the operating mechanism, the second overvoltage trip circuit being structured to trip open the separable contacts responsive to a function of both amplitude and duration of an overvoltage condition between the separable contacts and the neutral terminal.

The second overvoltage trip circuit may be further structured to provide a delayed trip of the separable contacts after detection of the overvoltage condition, the delayed trip being the function of both amplitude and duration of an overvoltage condition. The function may be defined by a time a voltage between the load terminal and the neutral terminal exceeds a predetermined voltage. The second overvoltage trip circuit may be further structured to be inactive when amplitude of the voltage between the load terminal and the neutral conductor is less than a predetermined value.

The first trip circuit may be an arc fault trip circuit including a delay circuit; and the second overvoltage trip circuit may include an output to the delay circuit.

A load conductor may be electrically connected between the separable contacts and the load terminal; a neutral conductor may be electrically connected to the neutral terminal; and the first trip circuit may be a ground fault trip circuit cooperating with the operating mechanism, the ground fault trip circuit being structured to trip open the separable contacts responsive to detection of a ground fault condition associated with a first current flowing through the separable contacts and a second current flowing through the neutral conductor.

As another aspect of the invention, a circuit interrupter comprises: a line terminal; a load terminal including an alternating current voltage; separable contacts electrically connected between the line terminal and the load terminal, the separable contacts including a current flowing therethrough; a neutral terminal; an operating mechanism structured to open and close the separable contacts; an arc fault trip circuit cooperating with the operating mechanism, the arc fault trip circuit being structured to trip open the separable contacts responsive to detection of an arc fault condition associated with the current flowing through the separable contacts; and an inhibit circuit cooperating with the arc fault trip circuit, the inhibit circuit being structured to disable the arc fault trip circuit responsive to the current flowing through the separable contacts exceeding a predetermined current value and the current flowing through the separable contacts defining a lagging load power factor.

The arc fault trip circuit may include a delay circuit; and the inhibit circuit may include an output to the delay circuit.

The inhibit circuit may be structured to continue to disable the arc fault trip circuit for a predetermined time after the current flowing through the separable contacts does not exceed the predetermined current value or the current flowing does not define the lagging load power factor.

As another aspect of the invention, a circuit interrupter comprises: a line terminal; a load terminal; separable contacts electrically connected between the line terminal and the load terminal; a neutral terminal; an operating mechanism structured to open and close the separable contacts; an arc fault trip circuit cooperating with the operating mechanism, the arc fault trip circuit being structured to trip open the separable contacts responsive to detection of an arc fault condition associated with the current flowing through the separable contacts; and a test circuit structured to test the arc fault trip circuit, the test circuit including an input member, an indicator, a first mode and a second mode, wherein the first mode of the test circuit is structured to repetitively activate the indicator responsive to proper operation of the arc fault trip circuit, and wherein the second mode of the test circuit is structured to test the arc fault trip circuit responsive to actuation of the input member and cause the arc fault trip circuit to trip open the separable contacts responsive to proper operation of the arc fault trip circuit.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the terms "exceed" or "exceeded" or variations thereof, mean to go beyond a number of a number of limits, measures or degrees.

The invention is described in association with a circuit breaker, although the invention is applicable to a wide range of circuit interrupters (e.g., without limitation, receptacles) structured to trip open separable contacts responsive to arc fault, ground fault and/or overvoltage conditions.

Figure 1:
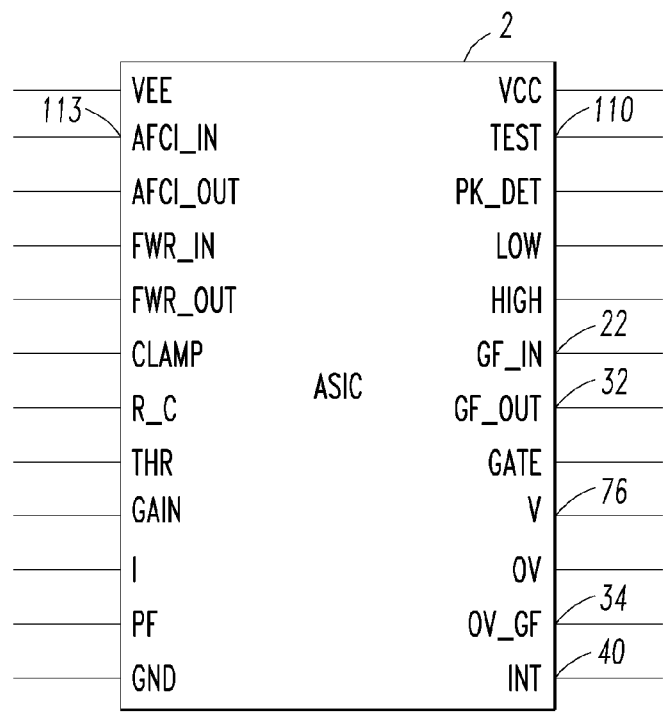
FIG. 1 is a block diagram showing the input and output pins of an arc fault/ground fault Application Specific Integrated Circuit (ASIC) in accordance with embodiments of the invention.

FIG. 1 shows the input and output pins of an arc fault/ground fault Application Specific Integrated Circuit (ASIC) 2.

Figure 2:
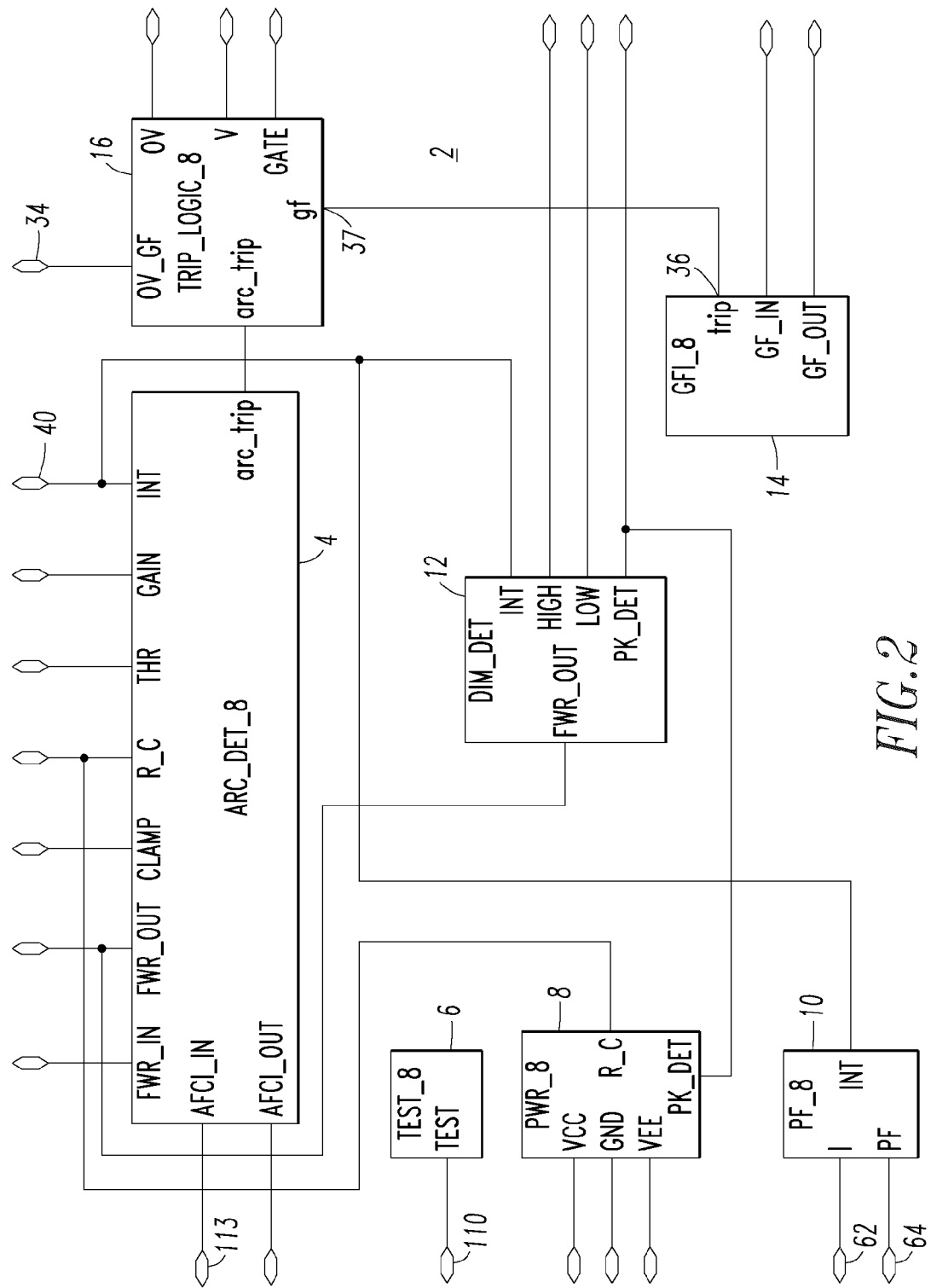
FIG. 2 is a block diagram of the ASIC of FIG. 1.

FIG. 2 shows details of the ASIC 2, which includes ARC_DET_8 4, TEST_8 6, PWR_8 8, PF_8 10, DIM_DET 12, GFI_8 14 and TRIP_LOGIC_8 16 circuits.

Figure 3:
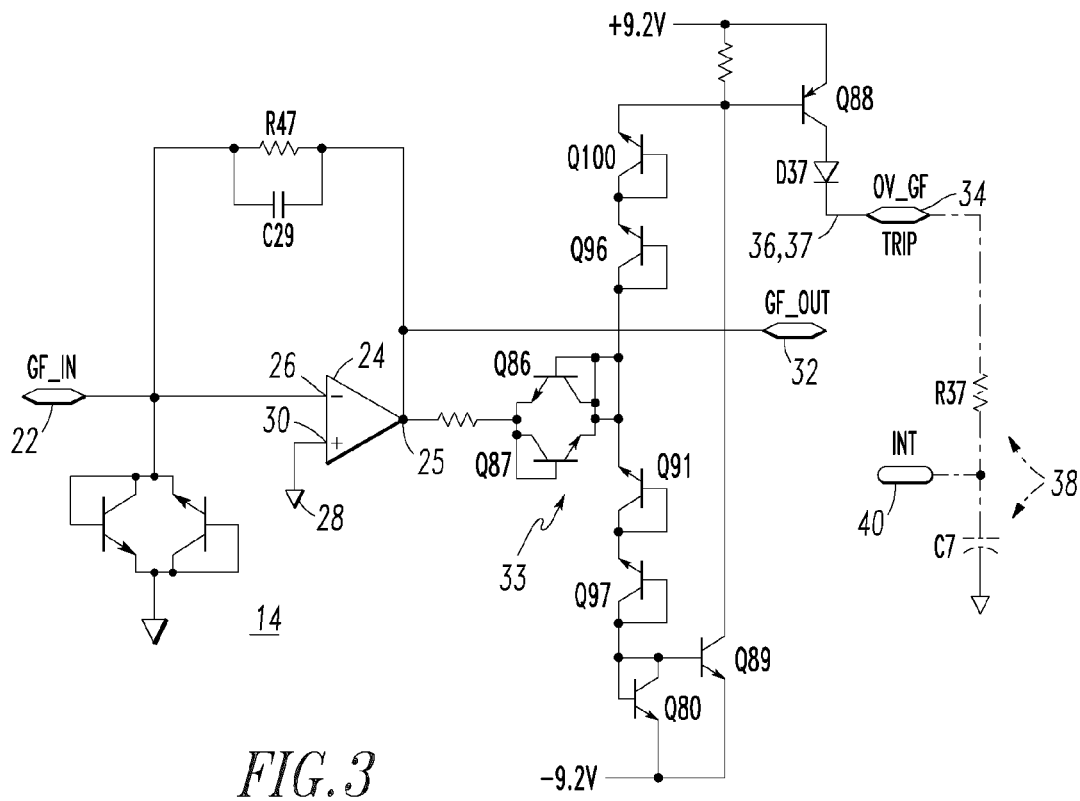
FIG. 3 is a block diagram in schematic form of the ground fault trip circuit of the ASIC of FIG. 1.

FIG. 3 shows the ground fault trip (GFI_8) circuit 14 (other circuitry is shown in phantom line drawing). For example, the ground fault trip circuit 14 introduces a delayed trip to prevent nuisance tripping due to relatively very short duration ground faults (e.g., without limitation, tripping due to a line voltage transient caused by lightning; tripping due to a disturbance caused by line capacitor switching).

Figure 4A:
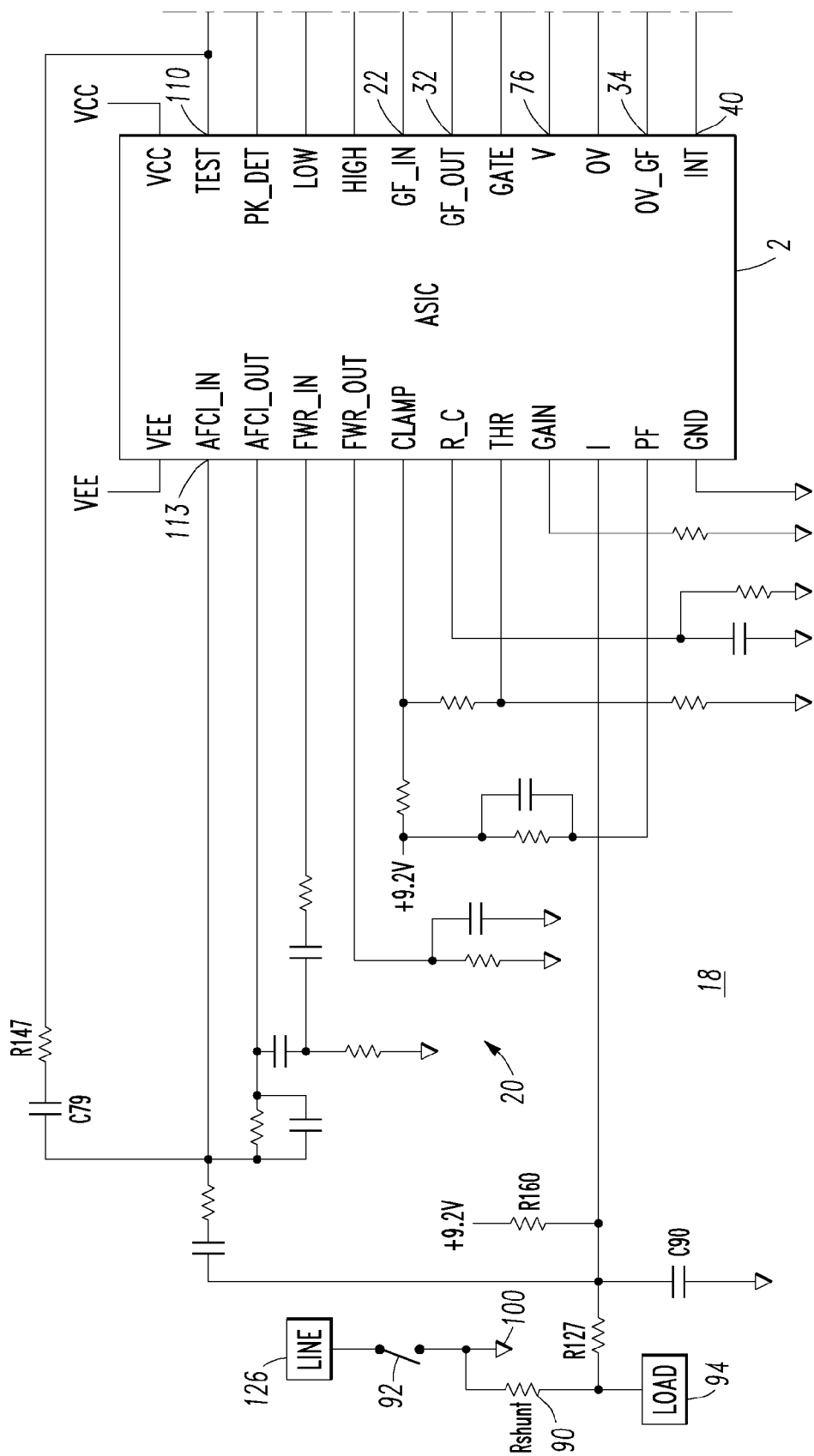
FIGS. 4A-4B form a block diagram in schematic form of an AFCI/GFCI including a ground fault/arc fault trip circuit and the ASIC of FIG. 1.
Figure 4B:
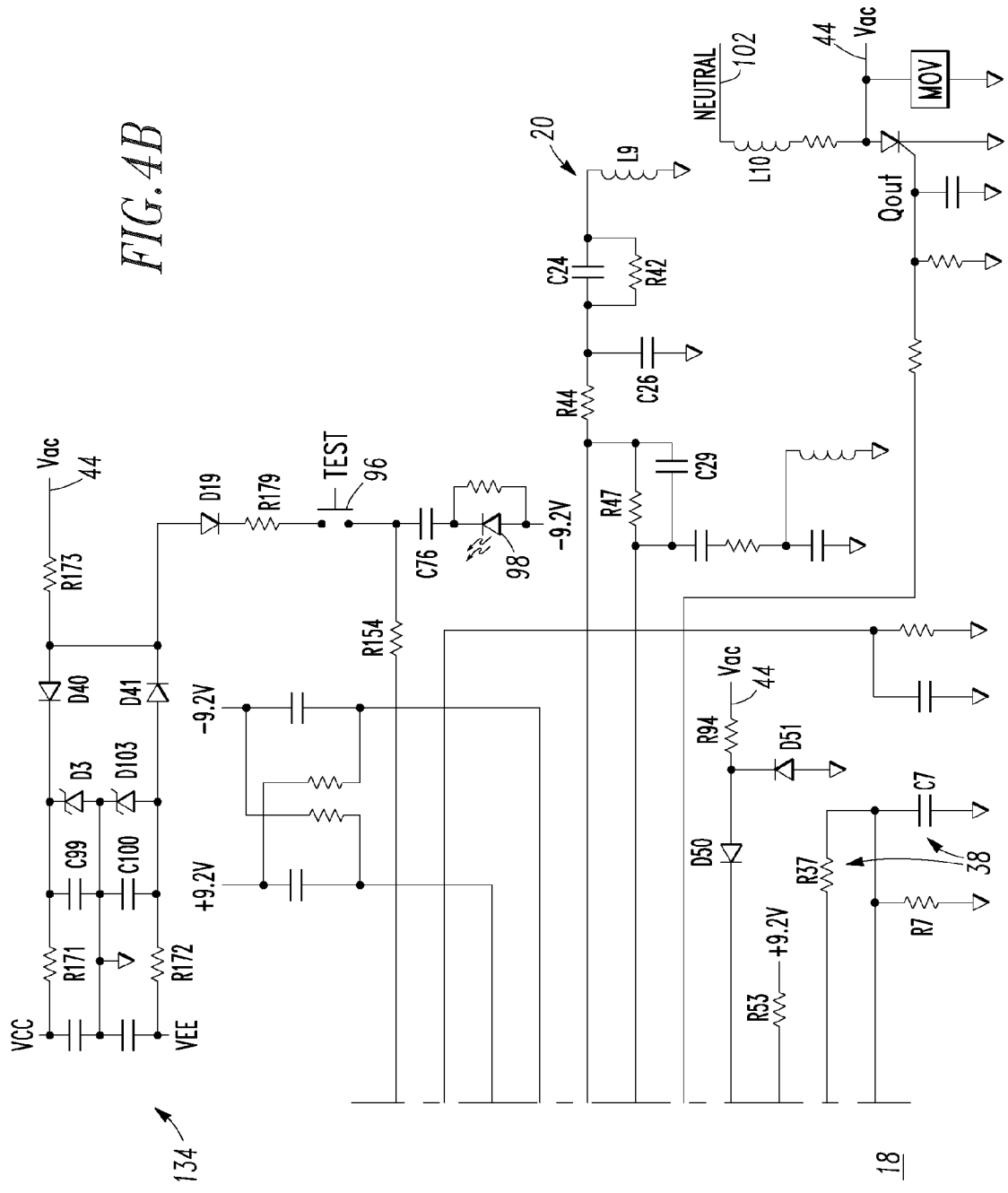
Figure 5:
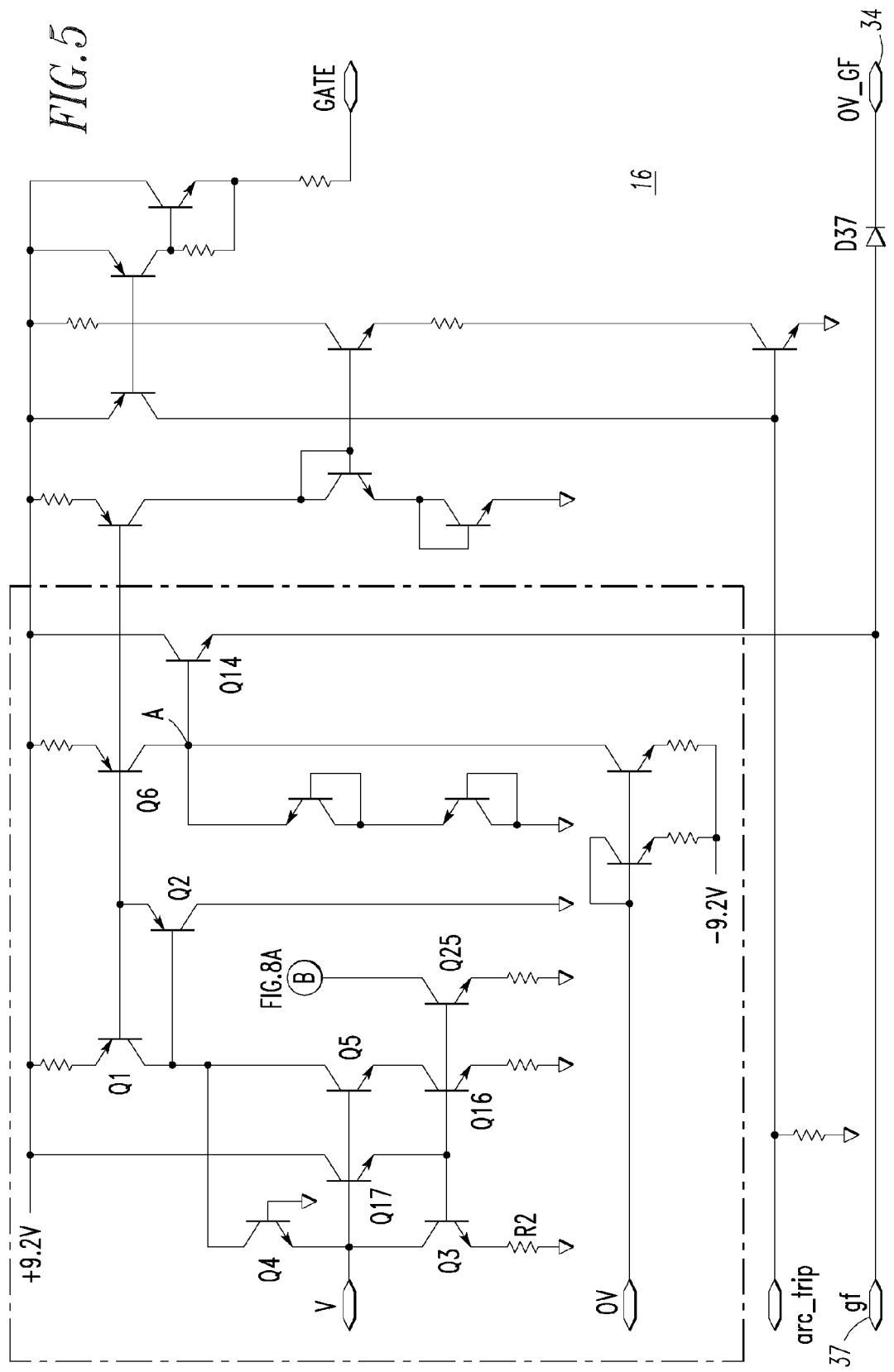
FIG. 5 is a block diagram in schematic form of the trip logic circuit of the ASIC of FIG. 1.

FIGS. 4A-4B show an AFCI/GFCI 18 including a ground fault/arc fault trip circuit 20 and the ASIC 2.

Referring to FIGS. 3 and 4A-4B, as is conventional, the ground fault current transformer L9 (FIGS. 4B and 12) and its associated resistors R44,R42 and capacitors C26,C24 feed the GF_IN pin 22 of the ASIC 2. By normal action of an operational amplifier 24 of the ground fault trip circuit 14, the inverting input 26, which is electrically connected to the GF_IN pin 22, is held at a virtual ground defined by ground reference 28 of non-inverting input 30, while current proportional to ground current passes from output 25 through resistor R47 and capacitor C29. A voltage proportional to this current is developed at the GF_OUT pin 32. The ground fault trip circuit 14 also includes a window comparator circuit 33. The collector output of transistor Q88 is off until the voltage at the GF_OUT pin 32 is high enough to cause conduction through transistors Q87,Q91,Q97,Q80, thereby, turning transistor Q89 on and, thus, transistor Q88 on or sufficiently low enough to cause conduction through transistors Q86,Q96, Q100, thereby, again turning transistor Q88 on.

Unlike the prior ASIC, the ASIC 2 includes a new output OV_GF pin 34. As shown in FIG. 2, a trip output 36 of the GFI_8 circuit 14 is input to the TRIP_LOGIC_8 circuit 16 (re-labeled as gf input 37) and directly passes through the TRIP_LOGIC_8 circuit 16 and being output as OV_GF pin 34.

As shown in FIGS. 3 and 4B, an RC circuit 38 formed by resistor R37 and capacitor C7 results in a time delay in the charging of capacitor C7 and, thus, tripping due to a ground fault is delayed. The capacitor C7 also serves the function of delaying arc fault tripping, which is initiated by input INT pin 40 of the ARC_DET_8 circuit 4.

Normally, there are two types of AFCI/GFCI circuit interrupters both of which provide arc fault protection. A first type provides equipment protection (e.g., an arbitrary 50 mA peak trip level), while a second type provides personnel protection (e.g., UL Listed GFCI protection; a required 7 mA peak trip level). There is no trip time specified for the equipment protection trip level (e.g., slower is better to avoid nuisance tripping), while the personnel protection trip time is specified in UL943 for a GFCI, which must trip in about 30 mS for a 250 mA ground fault. Because of this, the resistance of resistor R37 (FIGS. 3 and 4B) is relatively much smaller for personnel protection.

The ground fault trip circuit 14 and the RC circuit 38 formed by resistor R37 and capacitor C7 introduce a trip time delay. This delay is a function of the time duration that the limits of the window comparator circuit 33 (FIG. 3) are exceeded. For example, a single relatively short duration ground fault current pulse with a relatively very large amplitude will not result in a trip if voltage on capacitor C7 fails to reach the trip threshold before the pulse ends. The resistor R7 (FIG. 4B) in parallel with C7 will discharge C7 with an RC time constant of about 1 second. Should another similar pulse occur a few seconds later, the charging of C7 would start the voltage on C7 near its initial value of zero. In contrast, much smaller, but repetitive, pulses can result in a trip condition if the average C7 charging current exceeds the discharging current in R7. The trip will be delayed.

The fact that the trip output 36 of the GFI_8 circuit 14 and the gf input 37 of the TRIP_LOGIC_8 circuit 16 are the same and are also the same as the external OV_GF pin 34, was discussed above in connection with FIG. 2. The TRIP_LOGIC_8 circuit 16 of FIGS. 2 and 5-7 (other circuitry is shown in phantom line drawing in FIGS. 6 and 7) provides overvoltage protection. The overvoltage protection of the ASIC 2 provides a delayed trip during an overvoltage condition, while ensuring that the AFCI/GFCI 18 (FIGS. 4A-4B) does not trip during a normal, relatively short or momentary high voltage transient. Such transient conditions can occur during utility line capacitor switching or during an electrical storm. FIG. 4B shows an output switching device Qout, which is an example SCR, for the trip solenoid L10. Alternatively, a TRIAC can be used as the output switching device. Both cases will be described.

Figure 6:
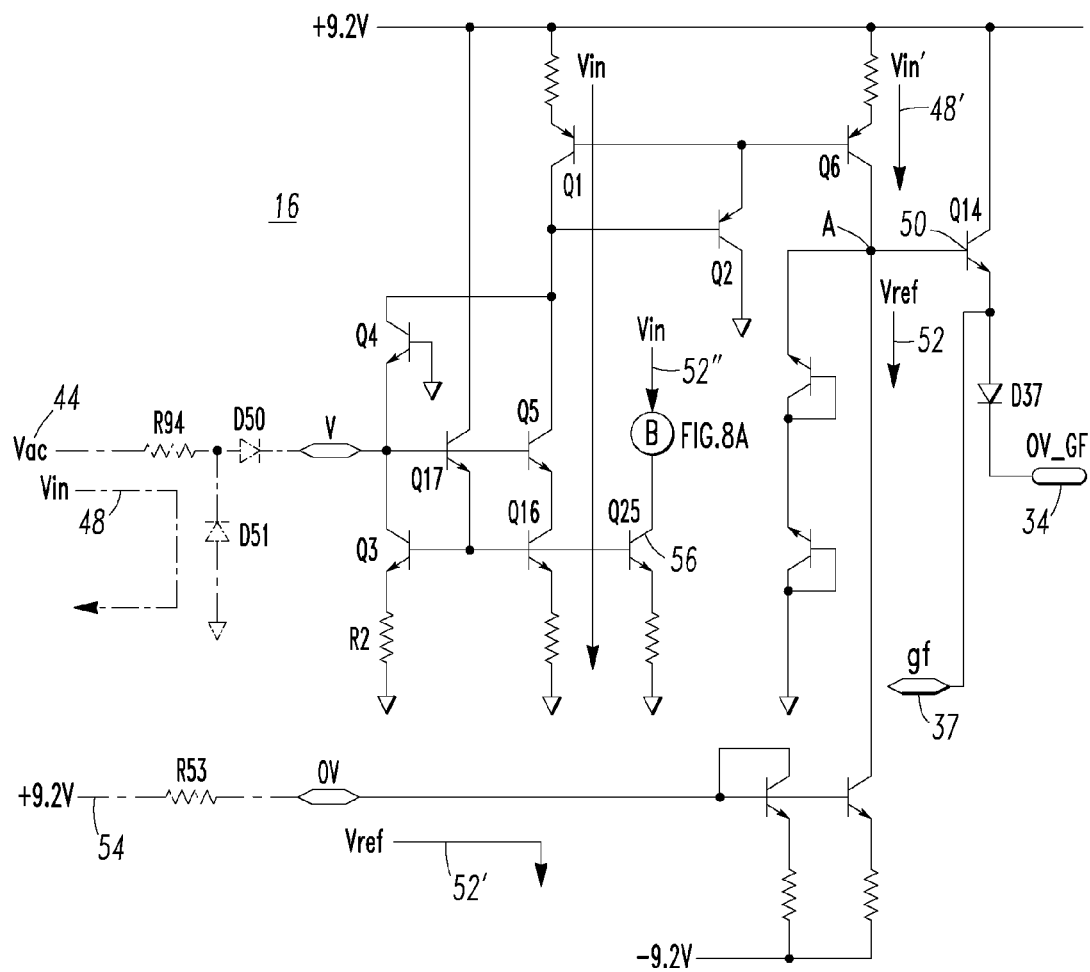
FIG. 6 is another block diagram in schematic form of the trip logic circuit of the ASIC of FIG. 1 shown during the positive half cycle of the instantaneous line voltage.
Figure 7:
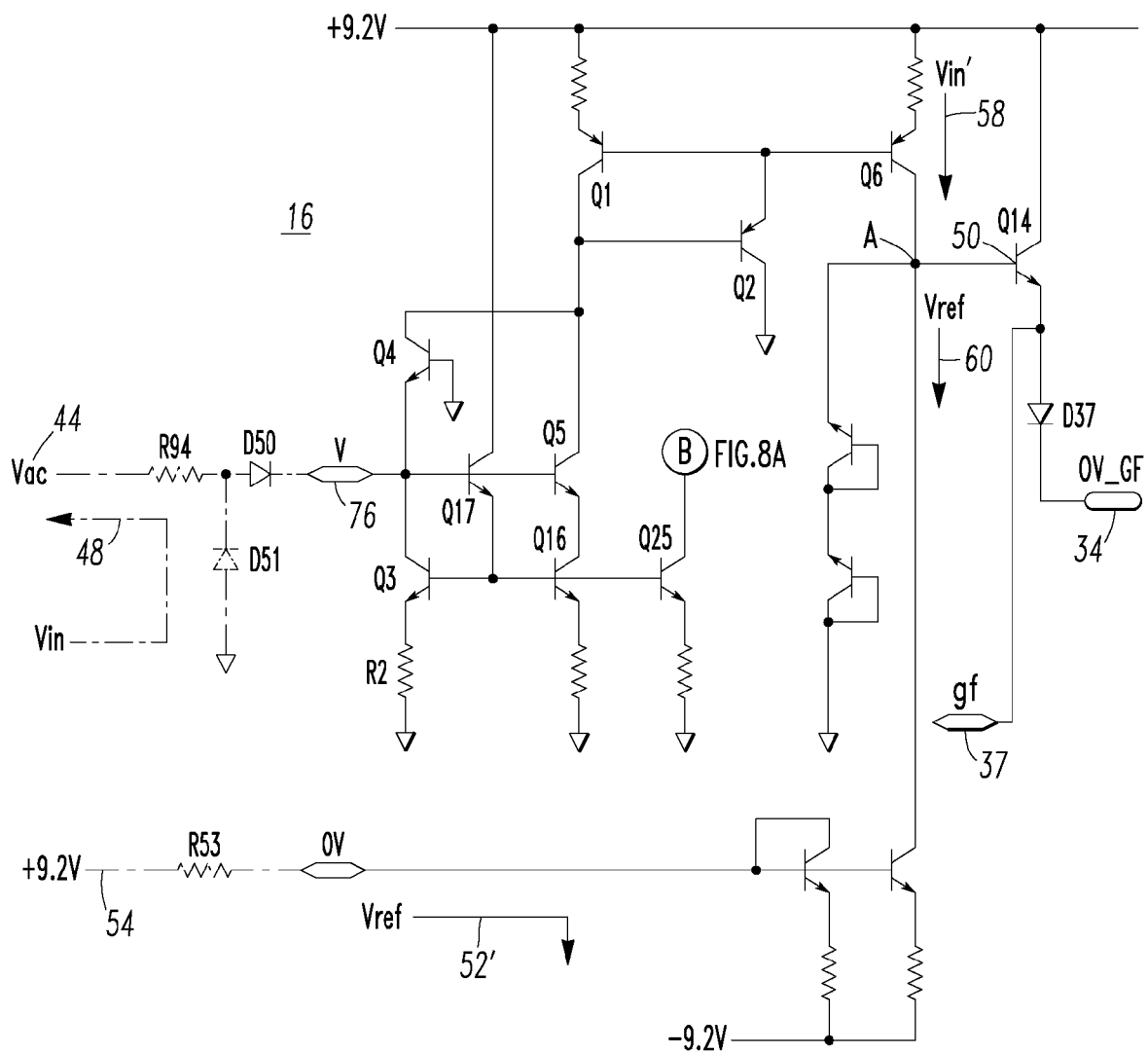
FIG. 7 is another block diagram in schematic form of the trip logic circuit of the ASIC of FIG. 1 shown during the negative half cycle of the instantaneous line voltage.

The overvoltage protection functions by converting the instantaneous line voltage Vac 44 (FIGS. 4B, 6 and 7) from the trip solenoid L10 (FIG. 4B) into a current through resistor R94 of FIGS. 4B, 6 and 7. As shown in FIG. 6, this current, Vin 48, during the positive half cycle of the line voltage, Vac 44, is "mirrored" through a conventional circuit including transistors Q3,Q5,Q16,Q17. The output of this current mirror Vin is again mirrored by a conventional current mirror formed from transistors Q1,Q2,Q6 that produces output current Vin' 48'. At the base 50 (node A) of transistor Q14, a current comparison occurs between the instantaneous value of mirrored Vin 48' and a DC reference current, Vref 52. This reference current 52 is a mirrored value of the current 52' flowing from reference voltage +9.2 V 54 through resistor R53 of FIG. 6. If the value of Vin 48' is larger than the value of Vref 52 at node A, then the difference current flows into the base 50 of transistor Q14, thereby turning it ON and raising the base voltage to about +9.2 V. The series combination of the external resistor R37 of FIG. 4B and the internal diode D37 of FIG. 6 is electrically connected to the OV_GF pin 34, which results in current flow into the integration capacitor C7 of FIGS. 3 and 4B. The diode D37 prevents flow back from the capacitor C7 into the OV_GF pin 34. The second Vin mirrored current 52" of FIG. 6 flowing into the collector 56 of transistor Q25 is used by the PF_8 circuit 10 (FIGS. 2 and 8A-8B), as will be discussed, below.

The ASIC 2 includes circuitry, not described, that ensures that gate current is only sourced from terminal GATE (FIGS. 1 and 4B) when both a trip is requested and the output switching device Qout is OFF. The gate turn-on current pulse is thus terminated as soon as Qout turns ON, thereby reducing unnecessary power supply loading. The voltage Vac 44 of FIG. 4B is the Qout anode voltage, and is thus essentially zero when Qout is ON. Referring to FIG. 7, during the negative half cycle of the instantaneous line voltage Vac 44, the diodes D50 and D51 cause the current Vin 48 to flow though D51 rather than from terminal V; hence, no current flows from terminal V. The ASIC 2 interprets this condition as Vac 44 being zero and Qout being ON. SCR gate current pulses are, thus, not generated when the SCR anode voltage is negative, a desirable feature since an SCR cannot conduct in a reverse direction.

Alternatively, when a TRIAC is used as the output switching device Qout, gate current turn-on pulses are required for both positive and negative values of Vac 44. In this case, the diodes D50 and D51 are removed, with resistor R94 being directly connected to terminal V of ASIC 2. During the negative half cycle of the instantaneous line voltage Vac 44, current can now flow from terminal V. This information can be used to ensure that gate current is generated when both a trip is requested and the output switching device Qout is OFF, blocking either a positive voltage or a negative voltage.

During the negative half cycle of the instantaneous line voltage Vac 44 of FIG. 7, the "mirroring" circuit including transistors Q3,Q17,Q5,Q16 of FIG. 6 is not employed. Instead, a simple base-grounded, emitter input, transistor circuit Q4 is employed. The role of transistor Q4 is to provide a current source input for the conventional current mirror formed by transistors Q1, Q2 and Q6 thereby improving the mirroring of Vin by Q1 and Q6. Here, the transistor Q25 is OFF, which is employed by the PF_8 circuit 10 (FIGS. 2 and 8A-8B) to determine the polarity of the instantaneous line voltage Vac 44. The comparison of mirrored Vin' 58 and Vref 60 at node A is the same as was discussed above in connection with Vin 48' and Vref 52, respectively, of FIG. 6, except that Vin' 58 is zero for Qout being an SCR.

The values of resistors R94 and R53 are suitably selected such that the currents associated with the highest expected peak voltage (e.g., without limitation, associated with the peak voltage of a sinusoidal 140 $VAC_{RMS}$ line voltage) is always less than Vref 60 and transistor Q14 is biased OFF. As the line voltage peak increases above this value, the OV_GF pin 34 goes high during a portion of each half cycle thereby beginning to charge the capacitor C7 of FIG. 3. The rate at which capacitor C7 charges is a function of how long Vin' 48' (FIG. 6) or Vin' 58 (FIG. 7) respectively exceed Vref 52 (FIG. 6) or Vref 60 (FIG. 7) such that the time-to-trip is a function of the amplitude and duration of the line overvoltage transient. Again, Vin' 58 is zero for Qout (FIG. 4B) being an SCR. The circuit 16 of FIGS. 5-7, thereby, protects the resistor R173 (FIG. 4B) from a sustained over-power condition. Other circuit components are suitably selected such that they are inherently safe under continual conditions up to the expected maximum voltage of about 240 $VAC_{RMS}$. A secondary advantage of this overvoltage protection function is that it protects electrical loads (e.g., without limitation, lamps; transformers; motors) on the associated branch circuit that can tolerate a relatively short overvoltage condition but not a sustained overvoltage.

Figure 8A:
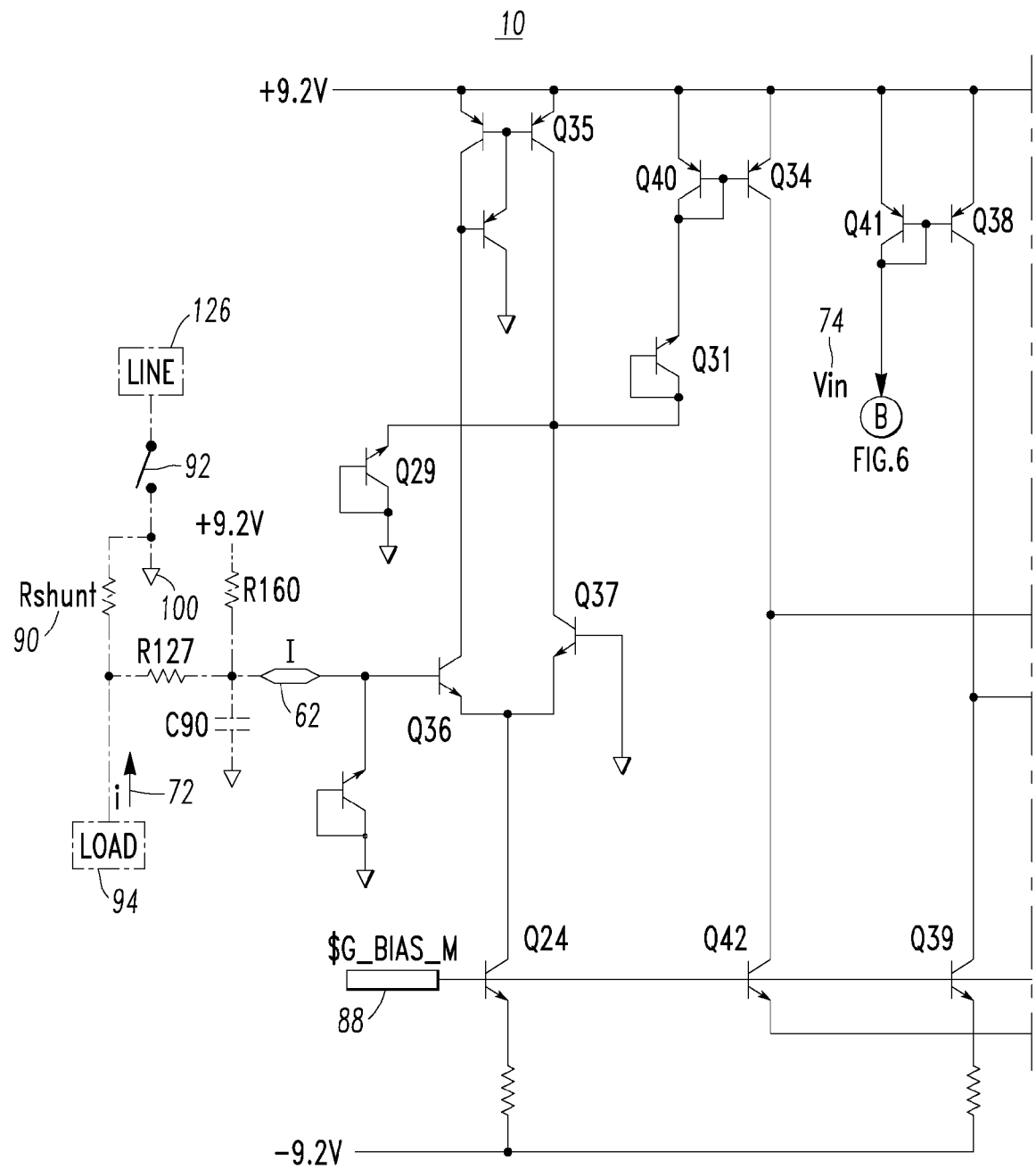
FIGS. 8A-8B form a block diagram in schematic form of the power factor logic circuit of the ASIC of FIG. 1.
Figure 8B:
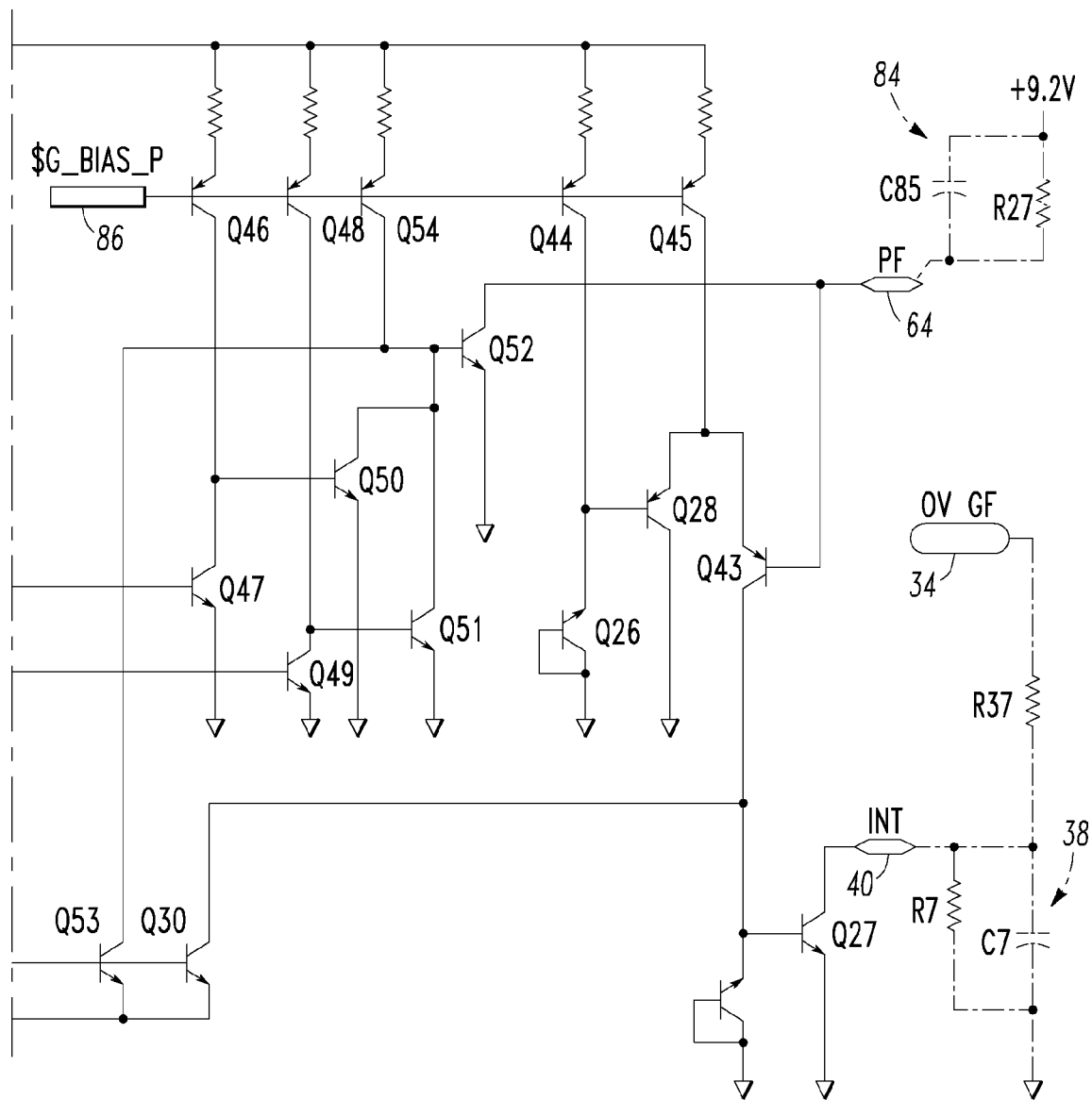
Figure 9:
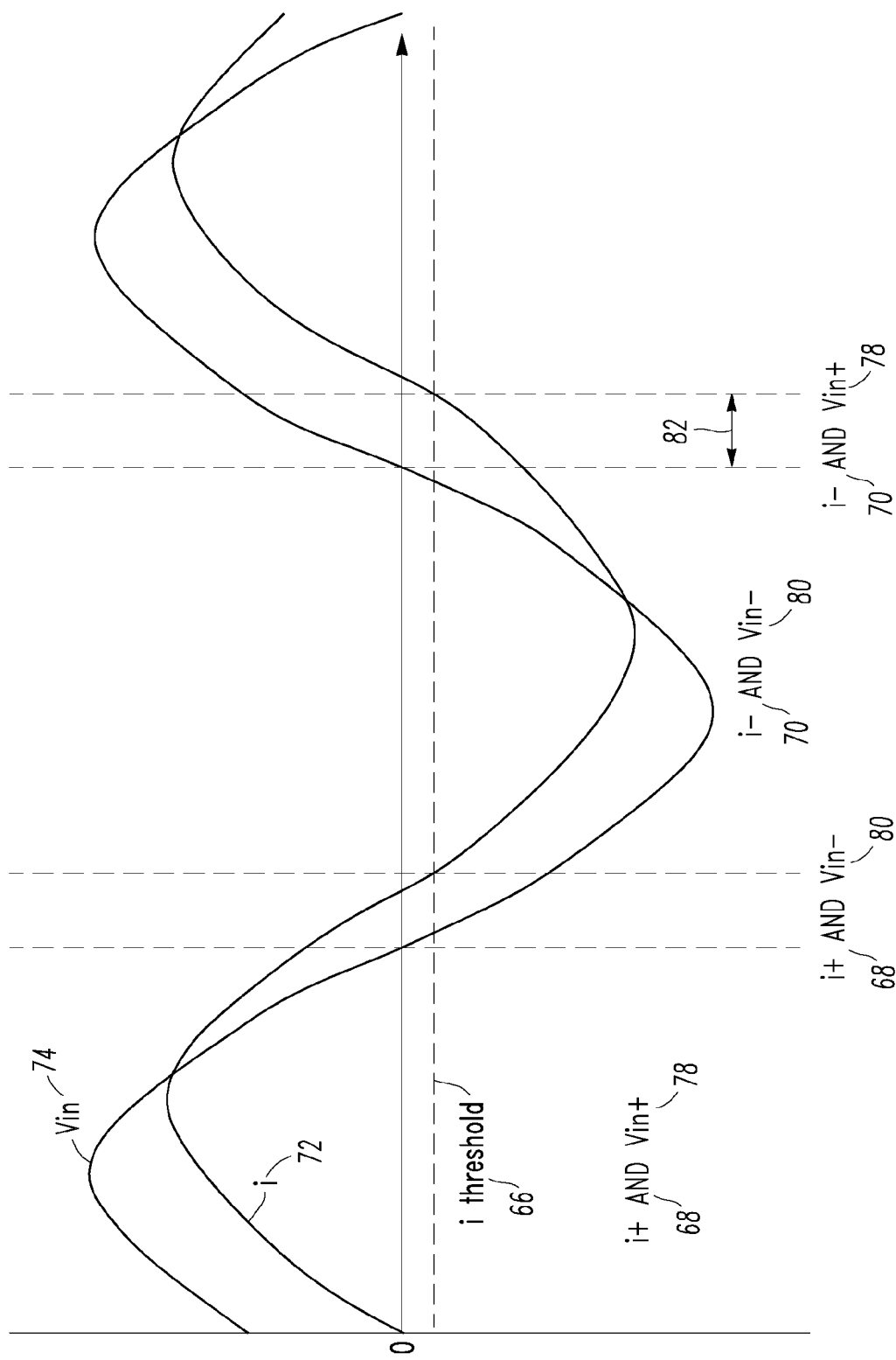
FIG. 9 is a plot of voltage and current associated with the power factor logic circuit of FIGS. 8A-8B.

FIGS. 8A-8B show the power factor logic circuit 10 of the ASIC 2 of FIG. 1 (other circuitry is shown in phantom line drawing). FIG. 9 plots voltage and current associated with the power factor logic circuit 10. The ASIC 2 inhibits tripping if a relatively very large and lagging current is detected. This load condition is relatively very short and is not present during normal operation. Hence, inhibiting a trip under such load condition is not a safety issue. The power factor circuit (PF_8) 10 of FIG. 2 includes the input pins I 62 and PF 64, as will be described, and the input INT pin 40, which receives the integration capacitor C7 for the arc fault trip circuit (AF_DET_8) 4. In this instance, however, the power factor circuit 10 drives the input INT pin 40 low, in order to inhibit tripping.

The power factor circuit (PF_8) 10 addresses a class of troublesome loads that cause nuisance tripping when first energized. These loads involve a relatively high inrush current with a lagging power factor. During normal conditions, the currents are below the circuit breaker overload tripping level (i.e., below the rated current of the AFCI/GFCI 18 of FIGS. 4A-4B) and the power factor becomes unity or leading. Hence, looking for a relatively high current with a lagging power factor during load turn on can be used to inhibit tripping during such an event.

The waveforms for such an event are shown in FIG. 9. The variable Vin 74 is shown as having both a positive half cycle and a negative half cycle. As discussed above, this corresponds to the use of a TRIAC output switching device for Qout (FIG. 4B). With the use of an SCR, the negative half cycle would not exist as diodes D50 and D51 would block such current. Biasing circuitry within the ASIC 2, not discussed, ensures that zero current from V (FIG. 6) is interpreted as a negative Vin half cycle.

The following explains that the power factor inhibit circuit 10 uses only the positive half cycle of Vin. Hence, the theory of operation, as discussed below, is the same for both the SCR and the TRIAC cases. A predetermined current level, i threshold 66, is the level (e.g., without limitation, −30 A peak) that the load current amplitude must exceed before the power factor circuit 10 is activated. This circuit 10 also looks for lagging power factor. The designations "i+" 68 and "i−" 70 indicate that the instantaneous value of the load current i 72 is, respectively, "greater than" and "less than" the predetermined current level, i threshold 66. The variable, Vin 74, is proportional to the load voltage and is essentially the same as Vin 48 of FIG. 6. This variable, Vin 74, is defined by the current flowing through resistor R94 of FIGS. 4B, 6 and 7 into input V pin 76 of the ASIC 2. The designations "Vin+" 78 and "Vin−" 80 indicate that the instantaneous value of the variable, Vin 74, is, respectively, "greater than" and "less than" zero.

The power factor circuit 10 looks for the condition where the instantaneous value of the load current i 72 is below the predetermined current level, i threshold 66 (as shown by i− 70 in FIG. 9), and where the load voltage proportional signal, Vin 74, is positive (as shown by Vin+ 78 in FIG. 9), as shown at 82 in FIG. 9. When this condition occurs, the integration capacitor C7 electrically connected to the bidirectional INT pin 40 is discharged. A time delay circuit 84 maintains capacitor C7 in a discharged state for a predetermined time of about 100 mS after the event is detected, in order to allow time for the load turn-on transient time interval to pass.

If the instantaneous value of the load current i 72 is greater than the predetermined current level, i threshold 66, then the power factor circuit 10 is inactive. Also, if the instantaneous value of the load current i 72 is below the predetermined current level, i threshold 66, but is resistive including high current arcing events, then the power factor circuit 10 is also inactive. The power factor circuit 10 is active at 82 where i 72 is less than i threshold 66 and Vin 74 is positive. The power factor circuit 10 will be active should a high current leading power factor condition occur, although such a condition does not exist in a typical home or residence.

Referring again to FIGS. 8A-8B, transistors Q37, Q40, Q34, Q41, Q38, Q47, Q49, Q52, Q43 and Q27 are conducting or ON during the time when the power factor disabling function is active. This condition occurs during time interval 82, shown in FIG. 9. Transistors Q46, Q48, Q54, Q44 and Q45 and Q24, Q42, Q39, Q53 and Q30 are constant current biasing sources. Voltage sources $G_BIAS_P 86 and $G_BIAS_M 88 are created in the power supply circuit (PWR 8) 8 of the ASIC 2 of FIGS. 2 and 10A.

The power factor disabling function is now described by starting at the end, with transistor Q27, and working back to the input condition that results in transistor Q27 being ON and, thus, discharging capacitor C7. Transistor Q27 is ON when transistor Q43, which is part of a differential voltage comparator circuit formed by transistors Q28 and Q43, is ON. That occurs when the voltage at the base of transistor Q43 is less than the voltage at the base of transistor Q28. The base voltage of transistor Q28 is about 6V, which results from the bias current from transistor Q44 flowing into Zener connected transistor Q26. If transistor Q52 is OFF, then the base voltage of transistor Q43 will be about 9.2V as a result of the pull-up resistor R27. Otherwise, if transistor Q52 is momentarily turned ON, then capacitor C85 will be charged to about 9.2V. When transistor Q52 turns OFF, transistor Q43 will remain ON until capacitor C85 is partially discharged. The time constant for this to occur is the capacitance of capacitor C85 times the resistance of resistor R27, which is about 100 mS as was discussed, above. For transistor Q52 to be ON, then both of transistors Q50 and Q51 must be OFF. That, in turn, requires both of transistors Q47 and Q49 to be ON. If, for example, transistor Q47 is not ON, then bias current from transistor Q46 becomes the base current for transistor Q50, thereby turning transistor Q50 ON. With transistor Q50 being ON, the base of transistor Q52 is clamped to ground and, thus, thus transistor Q52 is OFF.

As to the derivation of the voltage phase information, transistor Q49 is ON whenever the current mirror formed by transistors Q41 and Q38 is ON. The mirror current is Vin 74, which is the current through resistor R94. As was discussed, above, in connection with FIG. 6, the collector current of transistor Q25 is the mirrored value of Vin 74 (second Vin mirrored current 52").

As to the current phase and threshold information, the current input is derived from shunt Rshunt 90, which is a length of conductor between the separable contacts 92 and the load terminal 94. The voltage across this shunt 90 is fed to ASIC input I 62 through resistor R127, which serves three purposes. First, it limits current into the ASIC 2 during a relatively high current fault condition. Second, it forms part of an RC low pass filter with capacitor C90 that keeps high frequency noise type signals across the shunt 90 from entering the circuit. Third, it forms the lower leg of a resistive voltage divider, in which the upper leg is resistor R160. With no load, the base of transistor Q36 is biased positive. Transistors Q36 and Q37 form a differential voltage comparator referenced to ground. The base of transistor Q37 is grounded. With the collector current of transistor Q35 (which is the mirrored current of transistor Q36) conducting more than the collector current of transistor Q37, the difference in collector currents between transistors Q35 and Q37 flows into Zener connected transistor Q29. The collector voltage of transistor Q37 is, thus, about 6 V. This ensures that there is no current through Zener connected transistor Q31, thus, the current mirror formed by transistors Q40 and Q34 is OFF. In turn, there is no base current for transistor Q47, thus, it is OFF, thereby ensuring that transistor Q50 is ON. With Q50 ON, then transistor Q52 is OFF. As such, the trip disabling circuit is OFF.

When the instantaneous value of the load current i 72 is sufficiently negative, the positive bias voltage at ASIC input I 62 is overcome and the voltage at ASIC input I 62 can go negative. This causes transistor Q37 to conduct more than transistor Q36, with the difference current flowing through transistor Q31 and being mirrored by transistors Q40 and Q34. The output of that current mirror becomes the base current for transistor Q47, thereby turning transistor Q47 ON and transistor Q50 OFF. If transistor Q51 is also OFF, then Q52 is ON and power factor trip disabling is active. Transistor Q51 is OFF whenever Q49 is ON. In turn, Q49 is ON whenever Vin 74 is greater than zero.

Figure 10A:
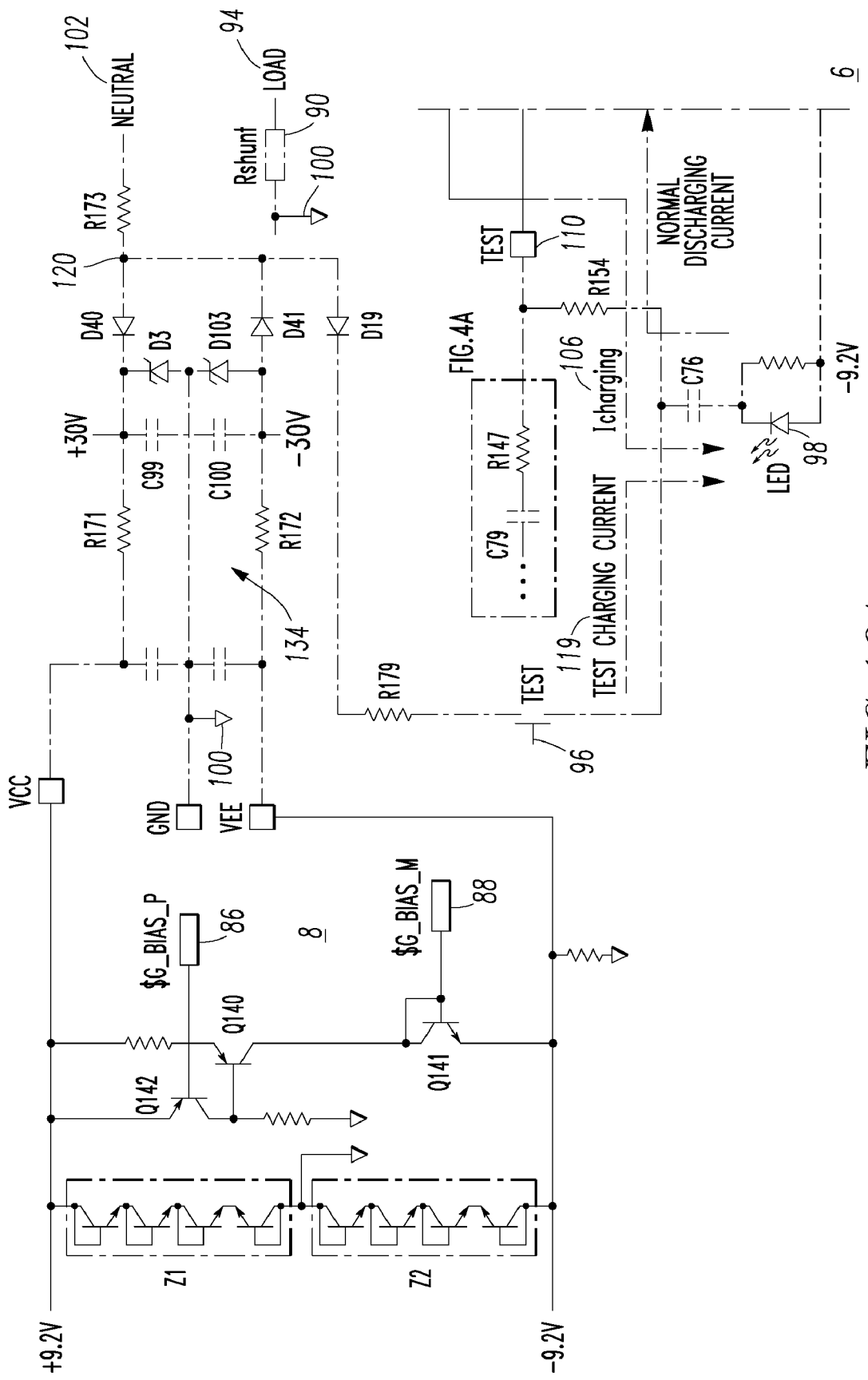
FIGS. 10A-10B form a block diagram in schematic form of the power supply circuit and the test button trigger (wellness) circuit of the ASIC of FIG. 1.
Figure 10B:
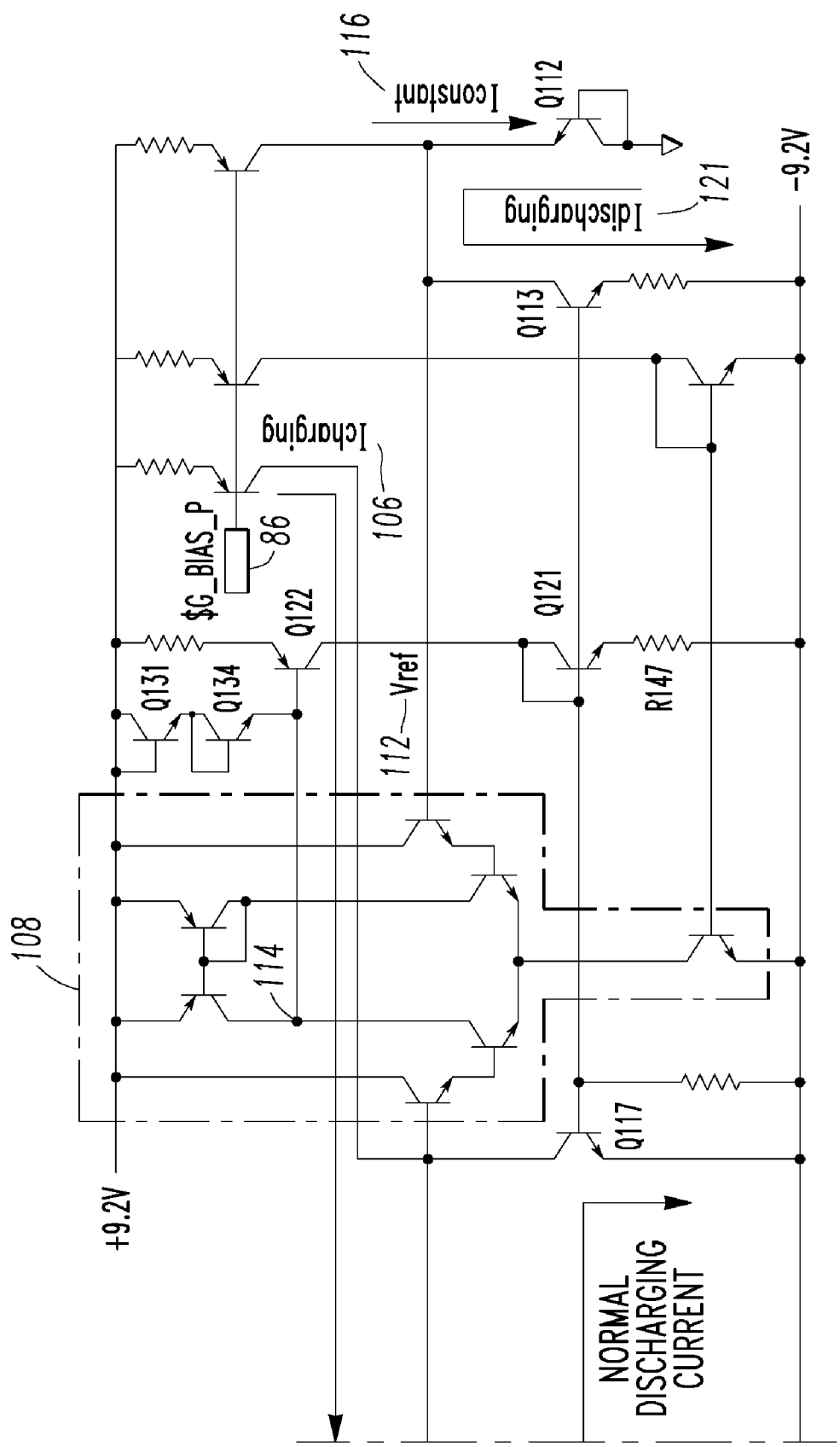
Figure 11:
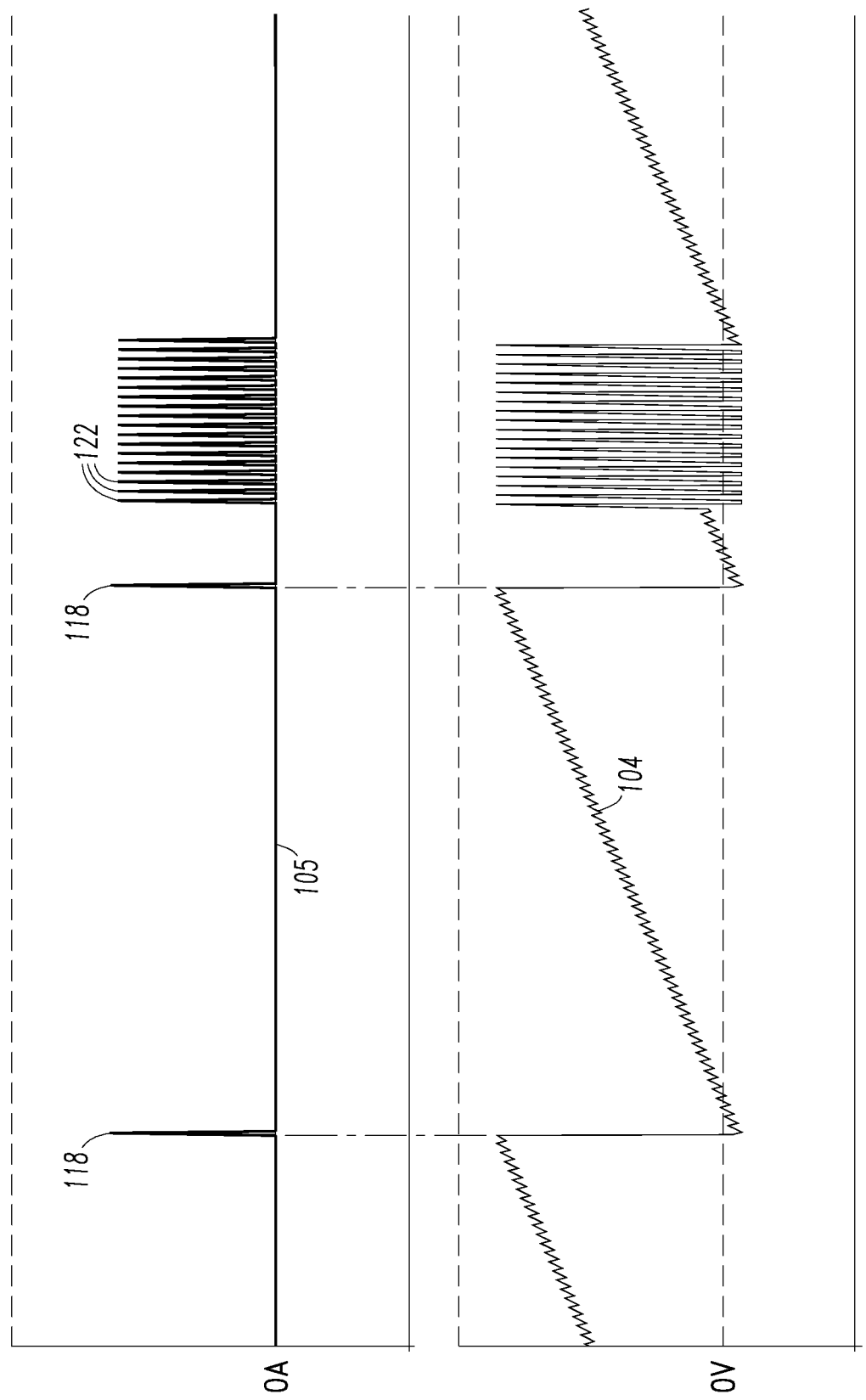
FIG. 11 shows two plots of waveforms of voltage across and current through the capacitor of the test button trigger (wellness) circuit of FIGS. 10A-10B in two modes thereof.

Referring to FIGS. 10A-10B and 11, the ASIC 2 employs the TEST_8 test button trigger circuit 6, as follows. If the TEST button 96 is pushed, then the circuit 6 functions in a conventional manner and the test button trigger circuit 6 is activated about once every alternating current line cycle. If, however, the TEST button 96 is not pushed, then the test button trigger circuit 6 is activated about once every second. A "wellness" heart beat pulse is used to blink the LED 98 that is remotely visible. If the LED 98 blinks, then a substantial portion of the AFCI 18 is operating properly. This meets the UL943 requirements, which may be moved into a future version of UL1699.

FIGS. 10A-10B show the ASIC power supply circuit (PWR_8) 8 and the test button trigger (wellness) circuit 6 (other circuitry is shown in phantom line drawing in FIG. 10A). The power supply common 100 is located between the separable contacts 92 (shown in FIGS. 4A and 12) and shunt Rshunt 90 that measures current. The voltage between the neutral conductor 102 and the common 100 is typically about 120 $VAC_{RMS}$ when the separable contacts 92 are closed. The power supply circuit 8 is essentially the same as that of the earlier ASIC, except that the resistance of resistor R173 is 19 KΩ instead of 9.5 KΩ. Hence, the power dissipation ($V^2/R$) of resistor R173 is, thus, halved. The current flowing through resistor R173, during the positive alternating current half cycle, flows through diode D40 and diode D3, creating a poorly regulated +DC voltage across capacitor C99 with a peak value of about 30 VDC. During the negative half cycle, current flows through diode D41 and diode D103, creating about −30 VDC across capacitor C100.

Within the ASIC 2, a string of series diode-connected transistors create Zener equivalent devices Z1 and Z2. Current flow from capacitor C99 into Zener equivalent device Z1 through resistor R171 creates a suitably stable voltage at terminal VCC of about +9.2 VDC that is used by the ASIC internal and external circuitry. A suitably stable voltage at terminal VEE of about −9.2 VDC is similarly produced through resistor R172 and Zener equivalent device Z2. Transistors Q142 and Q140 create the voltage source $G_BIAS_P 86 (FIG. 9) and with transistor Q141 create the voltage source $G_BIAS_M 88 (FIG. 9). A suitable power supply undervoltage trip disabling circuit (not shown) is preferably employed.

The wellness circuit 6 has two operating modes. Normally, in the first mode, the wellness circuit 6 creates a periodic pulse of light from the LED 98, approximately every second, if the majority of circuitry of the AFCI 2 is "well" and working properly. Otherwise, there is no light. When the TEST button 96 is pushed, the second operating mode is activated, which creates a single voltage pulse for each alternating current line cycle while pushed. These pulses are used to create a simulated arcing current input signal. Again, if the ASIC circuitry is working properly, then this input signal is processed and ultimately used by the ARC_DET_8 4 circuit to create a trip signal that results in opening of the separable contacts. Resistor R147 and capacitor C79 (shown in FIGS. 4A and 10A) couple voltage pulses generated at TEST pin 110 to the arc fault detection circuit 4.

FIG. 11 shows waveforms of the voltage 104 across and current 105 through capacitor C76 for the two operating modes. In the first or normal mode, the ASIC 2 sources a constant current (Icharging 106) of about 1.5 uA from TEST pin 110 into capacitor C76. This causes the voltage 104 across capacitor C76 to rise linearly as shown. A conventional voltage comparator circuit 108 includes inputs TEST 110 and Vref 112. When the voltage at TEST 110 exceeds the voltage at Vref 112 (e.g., about +6 VDC when capacitor C76 is being charged), the comparator output 114 sinks current through two diode connected transistors Q131,Q134. This results in transistor Q122 being turned ON. The voltage at Vref 112 during charging is generated by current Iconstant 116 flowing into emitter of transistor Q112. The collector current of transistor Q122 flows into diode connected transistor Q121 that by mirroring action turns transistors Q117 and Q113 ON. The resulting current (Idischarging 121) of transistor Q113 by design exceeds current Iconstant 116, thereby resulting in difference current (current of transistor Q 113 less Iconstant 116) flowing into the collector-base connection of transistor Q112. This switches the voltage at Vref 112 from about +6 VDC when charging capacitor C76 to about −0.5 VDC when discharging capacitor C76. The voltage drops across the transistor Q121 and its emitter resistor R147 also turns transistor Q117 ON, thereby rapidly discharging capacitor C76 through R154 and the LED 98. This current pulse 118, which flows through the capacitor C76 and the LED 98, produces a light pulse from the LED 98, which provides a suitable "wellness" indication. When the voltage at TEST 110 drops below the voltage at Vref 112, the comparator output current is switched thereby turning transistor Q122 OFF. The relatively slow charging of capacitor C76 is restored and this continues, thereby producing one light pulse about once per second.

When the TEST button 96 is pushed, a much higher charging current 119 is created through resistor R179. The source of this charging current is the about +30 V peak square wave voltage at the node 120 formed by diodes D40, D41 and resistor R173. A diode D19 in series with the TEST button 96 ensures that current flows only into capacitor C76. The current through resistor R179 is about 250 uA, thus, capacitor C76 is rapidly charged.

When the voltage at TEST 110 exceeds the voltage at Vref 112 and transistor Q117 is turned ON, by design, the collector current of transistor Q117 is made larger than the TEST charging current 119 of resistor R179, in order that capacitor C76 will be discharged. Even if the collector current of transistor Q117 does not initially exceed the current of resistor R179, the current through resistor R179 is zero during a negative line voltage cycle because of the diode D19. Hence, it is ensured that the comparator output 114 switches and one and only one pulse 122 will be produced each line cycle. These voltage pulses at TEST 110 cause current pulses to flow through the series connected components C79 and R147 to the AFCI_IN terminal 113 of the ASIC 2. These pulses are interpreted by the ASIC's arc fault detection circuit 4 as an arcing condition. If all of the AFCI circuitry is working properly, then a trip event will occur.

Figure 12:
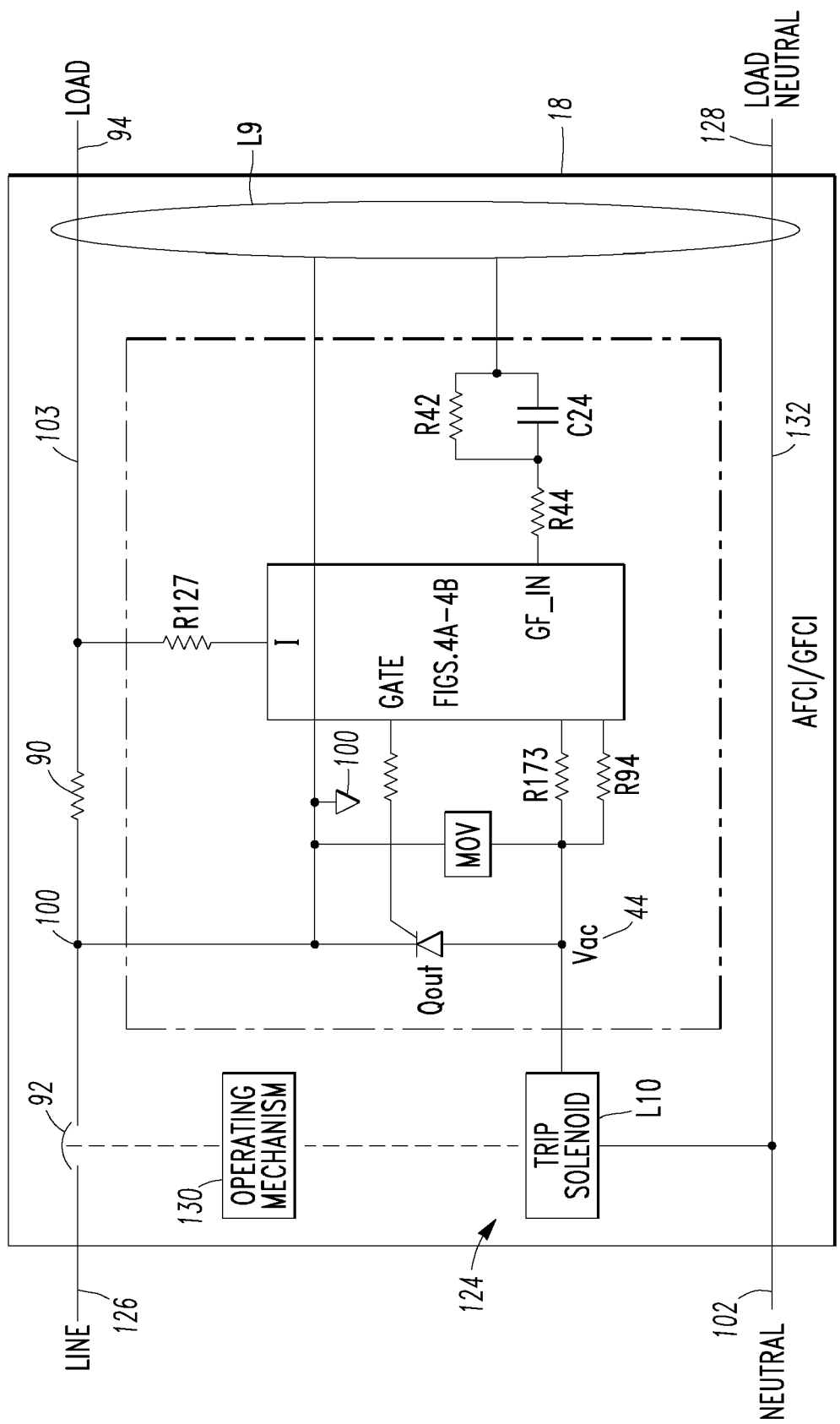
FIG. 12 is a simplified block diagram in schematic form of the AFCI/GFCI of FIGS. 4A-4B.

Referring to FIG. 12, a simplified view of the example AFCI/GFCI 18 of FIGS. 4A-4B is shown.

EXAMPLE 1

As shown in FIG. 12, four terminals include a line terminal 126, the neutral terminal 102, the load terminal 94, and a load-neutral terminal 128. As is conventional, an operating mechanism 130 is structured to open and close at least one pair of separable contacts, such as 92. Here, the operating mechanism 130 is responsive to a trip solenoid 124 (L10) to trip open the separable contacts 92. The neutral terminal 102 and the load-neutral terminal 128 are electrically connected to each other by a neutral conductor 132. The line terminal 126 and the load terminal 94 are electrically connected by the series combination of the separable contacts 92 (when closed), the low impedance shunt 90 and a load conductor 103. This configuration is employed to provide the GFCI function of the ground fault trip circuit 14, since the ground fault current sensor L9 measures the ground (differential) current, which is the difference between the load current flowing through the separable contacts 92 and the neutral current flowing through the conductor 132. For the GFCI function, power is provided from the common 100 and the neutral terminal 102. The GFCI function is not powered from the load terminal 94 and the neutral terminal 102, since the power supply current would improperly mimic a ground fault current.

EXAMPLE 2

When the GFCI is a circuit breaker, then only the one pair of separable contacts 92 is employed, since a circuit breaker cannot be miswired.

EXAMPLE 3

However, when the GFCI is a receptacle, then both the load and the neutral circuits have separable contacts since a user (e.g., without limitation, a homeowner) could get the line/load and neutral/load neutral interchanged.

EXAMPLE 4

When the circuit interrupter 18 solely provides the AFCI function, it does not require the load neutral terminal 128 or the neutral conductor 132. Here, only a neutral "pigtail", such as provided by the neutral terminal 102 is employed. The neutral terminal 102 is employed by the power supply circuits 8,134 as shown in FIG. 10A and by the trip logic circuit 16 shown in FIG. 2.

EXAMPLE 5

Similarly, when the circuit interrupter 18 solely provides the AFCI function, the ASIC circuits including the overvoltage function of the trip logic circuit 16, the wellness circuit 6, and the power factor circuit 10, do not require the load-neutral terminal 128 or the neutral conductor 132.

Although separable contacts 92 are disclosed, suitable solid state separable contacts may be employed. For example, the disclosed AFCI/GFCI 18 includes a suitable circuit interrupter mechanism, such as the separable contacts 92 that are opened and closed by the operating mechanism 130, although the invention is applicable to a wide range of circuit interruption mechanisms (e.g., without limitation, solid state or FET switches; contactor contacts) and/or solid state based control/protection devices (e.g., without limitation, drives; soft-starters).

Although an integration capacitor C7 is disclosed, any suitable delay circuit, such as for example and without limitation, an analog, digital and/or processor based delay circuit may be employed.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A circuit interrupter comprising:
  at least one pair of separable contacts;
  a load conductor
  a neutral conductor;
  an operating mechanism structured to open and close said at least one pair of separable contacts;
  an arc fault trip circuit cooperating with said operating mechanism, said arc fault trip circuit being structured to trip open said at least one pair of separable contacts responsive to detection of an arc fault condition associated with current flowing through said at least one pair of separable contacts; and
  a ground fault trip circuit cooperating with said operating mechanism, said ground fault trip circuit being structured to trip open said at least one pair of separable contacts responsive to detection of a ground fault condition associated . with current flowing through said at least one pair of separable contacts, said load conductor and said neutral conductor,
  wherein said arc fault trip circuit includes a delay circuit,
  wherein said ground fault trip circuit includes an output to said delay circuit;
  wherein a portion of said ground fault trip circuit and a portion of said arc fault trip circuit are both located in an application specific integrated circuit; and
  wherein said delay circuit is an integration capacitor; wherein said application specific integrated circuit includes an output pin, which is said output to said integration capacitor; and wherein said integration capacitor is located external to the output pin of said application specific integrated circuit; wherein a circuit connecting said application specific integrated circuit to said integration capacitor includes a resistor; wherein an RC circuit is formed by said resistor and said integration capacitor to provide a time delay in charging said integration capacitor and tripping open said at least one pair of separable contacts responsive to said ground fault condition; and wherein said capacitor also provides a time delay in tripping open said at least one pair of separable contacts responsive to said arc fault condition.

2. A circuit interrupter comprising:
  at least one pair of separable contacts;
  a load conductor
  a neutral conductor;
  an operating mechanism structured to open and close said at least one pair of separable contacts;
  an arc fault trip circuit cooperating with said operating mechanism, said arc fault trip circuit being structured to trip open said at least one pair of separable contacts responsive to detection of an arc fault condition associated with current flowing through said at least one pair of separable contacts; and
  a ground fault trip circuit cooperating with said operating mechanism, said ground fault trip circuit being structured to trip open said at least one pair of separable contacts responsive to detection of a ground fault condition associated with current flowing through said at least one pair of separable contacts, said load conductor and said neutral conductor,
  wherein said arc fault trip circuit includes a delay circuit,
  wherein said ground fault trip circuit includes an output to said delay circuit;
  wherein said ground fault trip circuit comprises a window comparator, a ground fault current transformer and an operational amplifier having an inverting input, a non-inverting input referenced to a ground reference, an output and an impedance electrically connected between the inverting input and the output of said operational amplifier; and wherein said window comparator includes an upper limit and a lower limit; and wherein said ground fault trip circuit provides a trip delay, which is a function of a time that one of the upper limit and the lower limit of said window comparator is exceeded by the output of said operational amplifier.

\* \* \* \* \*